United States Patent [19]

Li et al.

[11] 4,014,785

[45] Mar. 29, 1977

[54] NOVEL LIQUID MEMBRANE FORMULATIONS AND USES THEREOF

[75] Inventors: Norman N. Li, Edison; Gopal H. Singhal, Westfield, both of N.J.; Richard M. Minday, St. Paul, Minn.; Martin L. Gorbaty, Fanwood, N.J.

[73] Assignee: Exxon Research and Engineering Company, Linden, N.J.

[22] Filed: Oct. 9, 1975

[21] Appl. No.: 620,966

Related U.S. Application Data

[63] Continuation-in-part of Ser. No. 492,616, July 29, 1974, Pat. No. 3,959,173.

[52] U.S. Cl. .............................. 210/22 D; 210/21
[51] Int. Cl.$^2$ .......................................... B01D 13/00
[58] Field of Search ........... 210/21, 22, 321; 55/16, 55/158

[56] References Cited

UNITED STATES PATENTS 3,779,907  12/1973  Li et al. ........................ 210/22 X

*Primary Examiner*—Frank A. Spear, Jr.
*Attorney, Agent, or Firm*—Joseph J. Allocca; Ernest A. Forzano

[57] ABSTRACT

The instant invention relates to novel liquid membrane formulations, i.e., emulsions, which comprise an aqueous interior phase and a water-immiscible exterior phase; said water-immiscible exterior phase comprising an ethylene vinyl acetate copolymer and a solvent for this polymer. These compositions may additionally contain a water insoluble surfactant to stabilize the emulsions. In the most preferred embodiment, the aqueous interior phase comprises a strong acid, for example from about 1 to 10 percent by weight sulfuric acid. These emulsions are useful in liquid membrane processes for the separation of dissolved components from aqueous solution. Emulsions of the instant invention are characterized as showing very low swelling when contacted with aqueous solutions, especially at higher temperatures and thus are especially effective for use in the treatment of sour water feed streams by the liquid membrane technique.

17 Claims, No Drawings

NOVEL LIQUID MEMBRANE FORMULATIONS AND USES THEREOF

CROSS-REFERENCE OF RELATED APPLICATIONS

This case is a continuation-in-part of U.S. Ser. No. 492,616 filed July 29, 1974, now U.S. Pat. No. 3,459,173.

BACKGROUND OF THE INVENTION

1. Field of the Invention

The instant invention relates to novel liquid membrane formulations, i.e., emulsions, which comprise an aqueous interior phase and a water-immiscible exterior phase; said water-immiscible exterior phase comprising an ethylene vinyl acetate copolymer and a solvent for this polymer. These compositions may additionally contain a water insoluble surfactant to stabilize the emulsions. In the most preferred embodiment, the aqueous interior phase comprises a strong acid, for example, from about 1 to 10 percent by weight sulfuric acid. These emulsions are useful in liquid membrane processes for the separation of dissolved components from aqueous solution. Emulsions of the instant invention are characterized as showing very low swelling when contacted with aqueous solutions, especially at higher temperatures and thus are especially effective for use in the treatment of sour water feed streams by the liquid membrane technique.

2. Description of the Prior Art

In U.S. Ser. No. 382,466, filed July 25, 1973, in the names of N. N. Li and R. P. Cahn, a process for removing the salt of a weak acid and a weak base from solution by means of the liquid membrane technology disclosed in U.S. Pat. Nos. 3,410,794, 3,617,546, and 3,779,907, all herein incorporated by reference, is disclosed. The process disclosed in U.S. Ser. No. 382,466 utilizes the liquid membrane technology to remove either the weak acid or weak base or their hydrolysis products from solution by permeating through the external phase of the liquid membrane emulsion and converting same into a nonpermeable form in the interior phase. Simultaneously the weak acid or weak base or the hydrolysis products thereof is stripped from solution by means of an inert gas. This process has been found to be most effective when run at high temperatures, for example 80° C. It has been found, however, that, at temperatures in this range, many liquid membrane formulations, i.e., water-in-oil emulsions, are unsatisfactory, that is emulsion swelling, haziness of the treated water, etc. become problems. In the process of this invention, these problems are solved by means of novel formulations which may be used at temperatures of up to 95° C.

U.S. Pat. No. 3,779,907 to Li et al demonstrates the use of Span 80 condensed with ethylene oxide as a preferred nonionic surfactant in liquid membrane technology. In the instant invention, an ethylene vinyl alkanoate is the copolymer employed

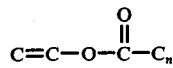

wherein $n$ may be from 1 to 20. Polymers of ethylene oxide and polymers of ethylene vinyl alkanoate cannot in any way be viewed as similar or analogous since clearly they are different in structure, composition and behavior due to the presence in the alkanoate of the classic

group which is attached to the polyethylene backbone which is lacking in the polyoxide formed by polymerization of ethylene oxide which yields ethers, i.e., polymers with oxygen in the polymer backbone. Of greater importance, however, is the fact that Span 80 was not included in the examples of the instant specification since only the best systems were specifically demonstrated and during the course of developing the instant invention, it was discovered that Span 80 used alone is useless in the liquid membranes of the instant application when applied to high temperature removal of comtaminants. At high temperatures, hydrolysis of the ester linkages of Span 80 in the presence of acids and bases is a distinct possibility. If Span 80 is used alone and not in the presence of ethylene vinyl alkanoate, the emulsion so formed breaks down. However, when it is included in a composition comprising a solvent, ethylene vinyl alkanoate and Span 80, the emulsion is likely to function properly in spite of the fact that the Span 80 decomposes in the presence of acid or base at elevated temperatures.

If Span 80 is reacted with ethylene oxide, the resulting polymer is not in the class described in the instant invention as an ethylene vinyl alkanoate copolymer.

Span 80 is the condensation product of sorbitol and oleic acid.

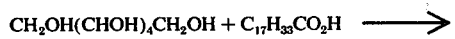

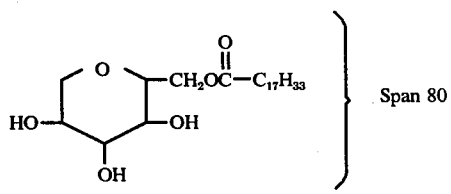

Obviously Span 80 is not an ethylene vinyl alkanoate copolymer.

If Span 80 is reacted with ethylene oxide, one gets:

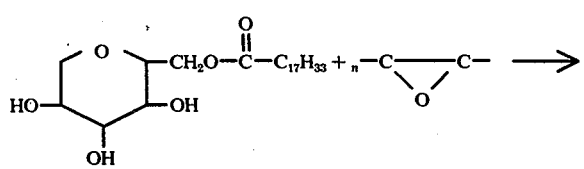

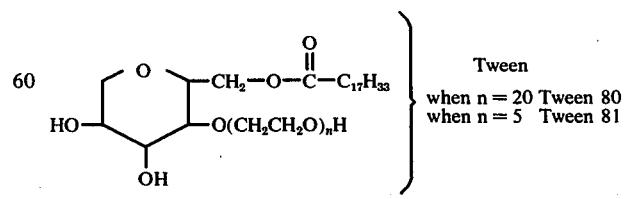

(it must be understood that only one isomer is represented above, reactions at the other —OH sites of Span 80 being equally possible and probable, the product being a combination of all the possible isomers), which is a compound commercially called Tween which also is not an ethylene vinyl alkanoate.

DESCRIPTION OF THE INVENTION

It has now been unexpectedly discovered that water-in-oil emulsions comprising an ethylene-vinyl acetate copolymer in the oil phase of said emulsion are especially effective in liquid membrane water treating processes which are run at high temperatures. These emulsions are characterized as having very low rates of swell when utilized in processes of this sort, especially when the emulsion comprises a strong acid interior phase. These emulsions are therefore extremely valuable in liquid membrane processes for the treatment of aqueous sour water streams.

In liquid membrane processes, the emulsion is brought into contact with an aqueous feed stream containing a dissolved material which is to be removed by permeation through the external phase of the emulsion (liquid membrane) into the internal phase, at conditions of constant agitation. The emulsion is then separated by discontinuing the agitation and allowing the emulsion to settle. The emulsions useful in water treating processes are characterized as water-in-oil emulsions and may be stabilized by incorporating an oil-soluble surfactant in the external phase of the emulsion. Due to the hydrophilic and lipophilic nature of the surfactant, rapid settling of the emulsion after contact with the aqueous feed stream is not always obtained. Furthermore, the emulsion especially when contacted with the aqueous feed stream at high temperatures, for example 80° C., has been known to swell and in certain cases the entire mass, i.e. feed stream and emulsion, has gelled. Finally, it has been noted in certain liquid membrane processes that after settling of a substantial portion of the emulsion the aqueous feed stream is left hazy due to the formation of very small emulsion particles, which do not settle with the bulk of the emulsion. When the liquid membrane process is utilized for water pollution abatement, haziness remaining in the treated water is completely unacceptable.

The compositions of the instant invention may be used in liquid membrane water treating processes to solve all of the above problems. The ethylene-vinyl acetate copolymer which is used in forming the composition of the instant invention is characterized as having a molecular weight of from about 500 to about 100,000, preferably from about 500 to 10,000. These polymers may be prepared by copolymerizing ethylene and vinyl acetate in a free radical process at high temperature and pressure. The polymers may be prepared by the process described in U.S. Pat. No. 3,683,349 and German Pat. No. 1,914,756 hereby incorporated by reference. The percentage of vinyl acetate in these copolymers may vary from 1 to 75 percent, but is preferably between 5 to 40 percent by weight.

In the above polymerization in place of vinyl acetate, other esters of vinyl alcohol containing from 1 to 20 carbon atoms in the alkanoate portion of the ester may be used. Example of such monomers include vinyl formate, vinyl propionate, vinyl neopentanoate, vinyl hexanoate, vinyl 2-ethyl hexanoate, vinyl decanoate, vinyl laurate, vinyl stearate, vinyl benzoate, vinyl salicylate, vinyl thiolacetate, vinyl pivalate, vinyl neodecanoate and the like. Similarly, esters of acrylic acid and methacrylic acid may be copolymerized with ethylene in place of or in combination with the above vinyl esters. Examples of such monomers include methylacrylate, ethyl acrylate, butyl acrylate, t-butyl acrylate, dodecyl acrylate, dodecyl methacrylate, 2-ethylhexyl methacrylate, methyl methacrylate and the like. In this case, acrylic acid and methacrylic acid can also be used in place of or in combination with the above acrylic and methacrylic esters. Many other vinyl monomers can be copolymerized with ethylene and will be apparent to those skilled in the art. Non-vinyl monomers such as allyl acetate and itaconic acid can also be used. The materials obtained by copolymerizing more than one monomer also yield terpolymers suitable in this application, such as for example ethylene in combination with vinyl acetate and methacrylic acid, vinyl propionate and methacrylic acid, vinyl acetate and dibutyl fumarate, vinyl acetate and mono-octyl maleate provide copolymers useful in this invention.

The only limitation on the above polymers is that they contain at least 25%, preferably from 25 to 75%, by weight ethylene in combination with a polar monomer copolymerizable therewith. This polar monomer is necessary to achieve the proper hydrophilic-lipophilic ratio in said copolymer.

In the discussion below the preferred embodiment of the instant invention, i.e., compositions based on ethylene-vinyl-acetate copolymers are discussed. It is to be noted that this discussion also applies to the other copolymers described above.

The ethylene-vinyl acetate polymers are combined with a solvent to form the external phase of the emulsions of the instant invention. The solvent must be capable of dissolving the ethylene vinyl acetate copolymer at conditions at which the emulsion is to be used.

In cases where high temperatures and strong acids or bases are used, it is essential that solvents be selected judiciously. Thus, solvents such as esters which can hydrolyze easily should not be used. Another restriction is volatility of solvents. Thus, hydrocarbons and other solvents which are volatile at 85° C. or are steam distillable should not be used. Another criteria for selection of solvents in water cleaning processes is toxicity. Solvents which leave toxic residues in water must be avoided. It is also important that solvents used in this process should be liquids under the operating conditions to provide liquid membranes. Thus the solvent should not have a tendency to solidify. The specific gravity of the solvent chosen will depend upon the internal reagent. The solvent should be selected so that the specific gravity of the formulated emulsion differs from that of the feed stream by at least 0.025. This process depends upon easy separation of the oil membrane from the feed, thus if the specific gravity falls between the limits given above, separation of the emulsion from feed would be a time-consuming process and is not desirable. Other considerations would be apparent to those skilled in the art. For the reasons given above, the preferred solvent will be chosen from the following group.

Petroleum distillates having a boiling point of >200° C. Higher boiling normal paraffins which have a melting point of 70° C. or more should not be used, unless they are mixed with other solvents to lower their melting points paraffinic solvents lightly substituted with halogens such as chlorine or benzene rings, i.e., less than 5 mole % may be used. More preferred solvents are the petroleum distillates known as isoparaffins having from 10 to 100 carbon atoms, most preferably from 30 to 75 carbon atoms. Examples of solvents of this type are the refined isoparaffins known as solvent neutral types, available from Exxon Chemical Company. Almost all of these are suitable in these applications such as for example Solvent Neutral 100, Solvent Neutral 150, Solvent Neutral 600 and the various grades in between. (The numeral refers to the viscosity in centistokes at 100° F.) Other petroleum fractions such as bright stock, Coray 90 which are petroleum lubricating oils having viscosities of 479.4 and 412.2 centistokes, respectively, at 100° F, and the like are also suitable. In many applications, it may also be desirable to use mixed solvents such as for example Solvent Neutral 100 and Solvent Neutral 600 in combination.

The emulsions of the instant invention preferably comprise an oil-soluble surfactant in combination with the above-described copolymer and solvent. The oil-soluble surfactant which may be used include anionic, cationic, or nonionic surfactants.

Anionic surfactants are useful for the process of the instant invention include:

Carboxylic acids, including fatty acids, rosin acids, tall oil acids, branched alkanoic acids, etc.

Alkali metal alkane and alkylaryl sulfonates, including alkyl benzene sulfonates, alkyl naphthalene sulfonates, etc.

The cationic surfactants useful for preparing the compositions of the instant invention include Quaternary amine salts.

Nonionic surfactants which are the preferred surfactant type for preparing the compositions of the instant invention, include the polyethenoxy-ether derivatives of alkyl phenols, alkylmercaptans, and alcohols, e.g., sorbitol, pentaerythritol, etc.

Particular preferred nonionic surfactants for use in the instant invention include compounds having the general formula

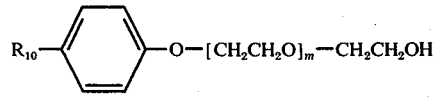

wherein $R_{10}$ may be $C_8H_{17}$, $C_9H_{19}$, or $C_{10}H_{21}$ and $m$ is an integer varying from 1.5 to 8.

Since the number of surfactants is extremely large, it is not intended to burden this application with numerous examples. The following publications may be referred to for further examples *Surface Chemistry* by Lloyd I. Osipow, Reinhold Publishing Company, New York (1962) chapter 8 and *Surface Activity*, Moilliet et al, Van Nostrand Company, Inc. (1961) Part III.

The above components, that is, ethylene vinyl acetate copolymer and solvent with or without a surfactant are selected with consideration of their interaction to form emulsions which are stable at high temperatures and in the presence of strong acids and bases. The specific combination are within the skill of the artisan in the field of emulsion technology with the teaching of this disclosure before him.

The interior phase of the emulsions of the instant invention are aqueous. Preferably, said interior phase comprises a strong acid, for example, sulfuric acid. The most preferred use for emulsions of the instant invention is in the treatment of aqueous sour water feed streams and thus preferably the strong acid is sulfuric acid at from 1 to 30, preferably from about 1 to about 10 weight percent. It has been known in the art of liquid membrane processing that the use of sulfuric acid in the internal phase of the emulsion gives rise to various difficulties, including the breaking up of the emulsion, i.e., emulsion leaking. By use of the copolymers described above, this problem is minimized. The emulsions of the instant invention are prepared by techniques known to the skilled artisan. For example, the copolymer with or without a surfactant may be dissolved in the solvent and the aqueous interior phase added to said solvent under conditions of agitation. In general, the emulsions of the instant invention are prepared by techniques known in the art. For example, the ethylene vinyl acetate copolymer may be dissolved in the solvent followed by the addition and dissolution of the surfactant. However, the components can be combined in any order. The aqueous internal phase may then be added to the oil phase while mixing by any of the devices known in the art for preparing stable emulsions. For example, a paddle with a strong stirrer operable at high speed to emulsify the components may be used.

Generally, the aqueous interior phase will comprise from 10 to 80 volume % of said emulsion, preferably from 20 to 60 volume %.

The surfactant may be incorporated into the external phase of the emulsion at from 0.01 to 20, preferably from 1 to 5 weight %. The copolymer will be incorporated into said external phase at from 1 to 40, preferably from 3 to 30 weight %.

As stated above, the emulsions of the instant invention are especially suitable for use in liquid membrane processes wherein the process is carried out at high temperatures, for example 80° C. One process of this sort is the liquid membrane process for sour water treating which is described and claimed in U.S. Ser. No. 382,466 herein incorporated by reference. When utilized in this process, the compositions of the instant invention show a much decreased rate of swell while showing comparative effectiveness for removal of ammonia from the aqueous solution. Following are specific embodiments of the instant invention:

EXAMPLE 1

In this example, various emulsions are utilized in a liquid membrane process for the treatment of sour water to compare the effectiveness of the emulsion formulation. The emulsions all comprise various additives dissolved in Solvent Neutral 100 which is an isoparaffinic hydrocarbon lubricating oil available from Exxon Chemical Company. This isoparaffinic lubricating oil is characterized as having a viscosity of 100 SUS at 100° F. The additives were dissolved at the weight indicated in Table I. In the instant example, 183 g. of an emulsion wherein the exterior phase comprised 55 volume % of the emulsion and the interior phase comprised 1% by weight sulfuric acid in water, was contacted with an aqueous feed stream containing various amounts of ammonia and ammonium ions. The emulsion and the feed stream were contacted in a volume ratio of 1:4. This contacting took place under conditions of agitation (200 RPM's) and a temperature of 85° C. As may be noted from the results in Table I all the emulsions were effective for the removal of ammonia. These specific emulsion formulations have been found to be the most effective formulations from ammonia removal in terms of transfer through liquid membrane, i.e., the external phase of the emulsion, into the interior phase. Thus, it is clear from these results that the compositions of the instant invention are at least as effective as the best known compositions for liquid membrane sour water treating. It should be noted that the temperature used in this experiment (85° C.) is an effective temperature for the treatment of sour water by the liquid membrane process.

The swell was measured in this example by contacting the emulsions with the ammonia containing feed stream in a manner similar to Example 1. At intervals the mixing was discontinued and the height of the emulsion measured, after 5 minutes settling. This is

TABLE I

Capacity for the Removal of Ammonia from Aqueous Feed

| Additive | Interior Reagent 1% $H_2SO_4$ Temperature 85° % in Solvent Neutral 100 | Mixing Time in min. | Feed $NH_4^+$ ppm | % $NH_3$ Removed |
|---|---|---|---|---|
| Ethylene-Vinyl | 10 | 0 | 108 | 0 |
| Acetate Copolymer, | | 1 | 57 | 47.3 |
| 37% by weight | | 5 | 16 | 85.2 |
| Vinyl Acetate, | | 15 | 2.0 | 98.1 |
| MW (number average | | 30 | 1.0 | 99.1 |
| about 2,000) | | 60 | 1.3 | 98.8 |
| | | 90 | 2.0 | 98.1 |
| Lubrizol | 12 | 0 | 80 | 0 |
| 3702, available from | | 1 | 74 | 7.5 |
| Lubrizol Corporation, reportedly | | 5 | 28 | 65.0 |
| a Copolymer | | 15 | 2.5 | 96.9 |
| of Styrene-Acrylonitrile | | 30 | 2.0 | 97.5 |
| and Acrylamide | | 60 | 1.5 | 98.2 |
| PIBSA-PE | 10 | 0 | 110 | 0 |
| The reaction | | 1 | 41 | 62.7 |
| product of | | 55 | 1.3 | 98.8 |
| polyisobutylene | | 15 | 1.4 | 98.7 |
| succinic anhydride | | 30 | 1.4 | 98.7 |
| and pentaerythritol | | 60 | 1.2 | 98.9 |
| | | 90 | 1.0 | 99.0 |

In the experiments described in this as well as the following examples, a very valuable observation was made. The emulsions using ethylene-vinyl acetate polymers settled very quickly. Thus, upon stopping the stirrer the oil phase and aqueous feed separated almost instantaneously without leaving any of the haze which is produced by suspension of very fine droplets of oil in the feed. With the other additives lengthy settling time to give clear feeds were required.

direct indication of swelling properties of the emulsion. It is clear from the results shown in Table II that the compositions of the instant invention have greatly reduced rates of swelling. As discussed above this property is very valuable in liquid membrane water treating processes.

TABLE II

| | Swell Properties of the Emulsions 1% $H_2SO_4$ Interior Reagent % Swell after Mixing | | | |
|---|---|---|---|---|
| Time (min.) | Ethylene-Vinyl-Acetate Copolymer**(10)* | Lubrizol 3702 (12)* | PIBSA-PE (10)* | Sulfobutyl 2% $SO_3H$ (3.3)* |
| 0 | 0 | 0 | 0 | 0 |
| 1 | 0 | 0 | 0 | 0 |
| 5 | −4.2 | 0 | 0 | 4.3 |
| 15 | −4.2 | 8.3 | 0 | Not Measured |
| 30 | −8.2 | 8.3 | 6 | 30.4 |
| 60 | −12.5 | Not Measured | 20 | 43.5 |
| 90 | −16.7 | 29 | 36 | 56.5 |
| 100 | — | 42 | — | — |

*% Additive in Solvent Neutral 100.
**See Example 1

EXAMPLE 2

The same emulsions were compared for rate of settling and swell. Another effective formulation for sour water treating which utilizes a sulfobutyl polymer as an additive for the external phase of the emulsion was also compared. This composition has been claimed in U.S. Patent application Ser. No. 482,592, now U.S. Pat. No. 3,969,265, filed on June 24, 1974 in the names of Singhal, Gorbaty, Minday and Li, disclosed that sulfobutyl based emulsions have excellent high temperature stability, and thus are useful in liquid membrane sour water treating processes.

EXAMPLE 3

In this experiment, emulsions similar to those tested in Example 1 and 2 except that a 10% sulfuric acid interior phase was utilized were again compared for swelling rate. At this higher concentration of sulfuric acid which would be commercially significant in a liquid membrane sour water treating process wherein the capacity of the emulsion for neutralization of ammonia is important, the compositions of the instant invention show even more dramatic improvement. It should be noted that the next best composition, i.e., that based on sulfonate butyl rubber, showed approximately three times as much swell while the sampel based on Lubrizol 3702 was completely inoperative in that is gelled in 5 minutes.

TABLE III

Swell Properties at 85°
(Interior Reagent 10% $H_2SO_4$)

| Time (min.) | Ethylene-Vinyl-Acetate Copolymer (See Example 1) (10)* | Lubrizol 3702 (12)* | PIBSA-PE (10)* | Sulfobutyl 2% $SO_3H$ (3.3)* |
|---|---|---|---|---|
| 0 | 0 | 0 | 0 | 0 |
| 1 | 0 | Completely gels in 5 – 15 min. | 4 | 6 |
| 5 | 0 | | 50 | 13 |
| 15 | 7 | | 90 | 25 |
| 30 | 16 | | 108 | — |
| 60 | 24 | | 158 | 75 |

*% Additive in Solvent Neutral 100

What is claimed is:

1. A process for removing the salt of a weak acid and a weak base from aqueous solution which comprises contacting said solution with an emulsion, said emulsion comprising an exterior phase, said exterior phase being characterized as immiscible with said solution and permeable to said weak base, and said exterior phase comprising (a) an ethylene vinyl alkanoate copolymer, wherein the alkanoate group has from 1 to 20 carbons, comprising at least 25% by weight ethylene and (b) a solvent for said copolymer, the solvent having a boiling point of greater than 85° C and selected from the group consisting of petroleum distillates and paraffinic solvents including paraffinic solvents bearing substituents selected from the group consisting of halogens and aromatics, and an interior phase, said interior phase comprising a strong acid which is capable of converting said weak base to an impermeable form whereby said weak base permeates through said exterior phase into said interior phase wherein it is converted to a nonpermeable form, and removing said weak acid by passing an inert gas through said solution or subjecting the system to subatmospheric pressures, said removal being carried out at a temperature of from 75°–220° F.

2. The process of claim 1 wherein said inert gas is steam, air or nitrogen.

3. The process of claim 1 wherein said weak acid is selected from the group consisting of $H_2S$, $SO_2$, $CO_2$, HCN, HF, phenol, O, m, and p hydroxytoluene, and O, m and p dihydroxybenzene.

4. The process of claim 1 wherein said weak base is selected from the group consisting of ammonia and amines.

5. The process of claim 1 wherein said salt is ammonium sulfide.

6. The process of claim 1 wherein said removal is carried out at a pressure from 0.2 to 1 psig.

7. The process of claim 5 wherein said ammonium sulfide comprises from 20 to 10,000 ppm by weight of said solution.

8. The process of claim 1 wherein said reactant comprises an acid selected from the group consisting of phosphoric acid, sulfuric acid, and hydrochloric acid.

9. The process of claim 1 wherein said reactant comprises an acid selected from the group consisting of benzene polycarboxylic acids, aliphatic polycarboxylic acids, sulfo carboxylic acids and acid salts thereof.

10. The process of claim 9 wherein said emulsion is separated from said solution after the acid reactant is substantially neutralized and conveyed to a regeneration zone wherein said emulsion is contacted with steam at a temperature of from 230° to 450° F and at a pressure of from 5 to 300 psig for a period sufficiently to regenerate said acid reactant.

11. The process of claim 1, wherein ethylene comprises from 25 to 75% by weight of said copolymer in said exterior phase.

12. The process of claim 1, wherein said copolymer in said exterior phase is an ethylene vinyl acetate copolymer.

13. The process of claim 1, wherein said copolymer in said exterior phase has a molecular weight from 500 to 10,000.

14. The process of claim 1, wherein said aqueous interior phase comprises from 20 to 60 volume % of said emulsion.

15. The process of claim 1, wherein said copolymer comprises from 2 to 30 weight percent of said exterior phase.

16. The process of claim 1, wherein said solvent in said exterior phase is a hydrocarbon.

17. The process of claim 16, wherein said hydrocarbon is an isoparaffin.

* * * * *